United States Patent [19]
Rittenbach

[11] Patent Number: 6,037,897
[45] Date of Patent: Mar. 14, 2000

[54] APPARATUS AND METHODS FOR MOVING TARGET INDICATOR SIMULATION

[75] Inventor: Otto E. Rittenbach, Neptune, N.J.

[73] Assignee: The United States of America as represented by the Secretary of the Army, Washington, D.C.

[21] Appl. No.: 09/289,765

[22] Filed: Apr. 12, 1999

[51] Int. Cl.[7] .................................................. G01S 7/40
[52] U.S. Cl. ...................... 342/169; 342/170; 342/171; 342/17; 434/2
[58] Field of Search .................................... 342/165, 169, 342/170, 171, 172, 173, 174, 192, 194, 196; 434/2

[56] References Cited

U.S. PATENT DOCUMENTS

| | | | |
|---|---|---|---|
| 3,329,953 | 7/1967 | Adams et al. | 342/171 |
| 3,331,070 | 7/1967 | Sommers et al. | 342/169 |
| 4,168,582 | 9/1979 | Heidrich | 434/2 |
| 4,319,247 | 3/1982 | Warren | 342/171 |
| 4,686,534 | 8/1987 | Eddy | 342/165 |

OTHER PUBLICATIONS

"Airborne adaptive MTI scheme with preventing the whitening of the target", Huang Yong; Peng Yingning; Wang Xiqin, IEEE Aerospace and Electronics Systems Magazine, vol.: 14 Jul. 7, 1999, pp.: 19–21.

"NaRCoSiS–the naval radar computer simulation suite", Donnelly, R.P.; Brice, E.A.; Hill, L.J.; Horseman, A.M.; Marsh, D.T.; Martin, W.M.C., Radar System Modelling (Ref. No. 1998/459), IEE Colloquium on, 1998, pp. 11/1–11/8.

"Optimal loading factor for mininal sample support space–time adaptive radar", Kim, Y.L.; Pillai, S.U.; Guerci, J.R., Acoustics, Speech and Signal Processing, 1998, Proceedings of the 1998 IEEE International Conference on, vol.: 4, 1998, p. 2505.

"The PACES digital engagement model", Gau, E.L., Aerospace and Electronics Conference, 1997. NAECON 1997, Proceedings of the IEEE 1997 National, vol.: 2, 1997, pp.: 559–563 vol. 2.

"Adaptive implementation of optimum MTI processor", Park, Y.C.; Kim, W.K.; Youn, D.H. , Acoustics, Speech, and Signal Processing, 1993. ICASSP–93, 1993 IEEE International Conference on, vol.: 3 , 1993 , pp. 567–570 vol. 3.

"Computer simulation study of MTI using FFT and nonlinear processors", Prabhu, K.M.M.; Bagan, K.B. , Acoustics, Speech, and Signal Processing, 1992. ICASSP–92., 1992 IEEE International Conference on, vol.: 5 , 1992 , pp. 505–508 vol. 5.

"A VHSIC demonstration radar signal processor", Fitzpatrick, J.; Vojir, W., Aerospace and Electronics Conference, 1988, NAECON 1988., Proceedings of the IEEE 1988 National , 1988 , pp. 28–34 vol. 1.

*Primary Examiner*—John B. Sotomayor
*Attorney, Agent, or Firm*—Michael Zelenka; George B. Tereschuk

[57] ABSTRACT

A moving target simulator system for pulse Doppler radar includes a processor for processing received radar signal and transforming the signal into patterned pulses before subjecting the patterned pulses to an 180 degree phase-shift by a phase-shifter. The system also includes a reference signal provided by a corner reflector located in proximity of the simulator. The reference signal and a phase-shifted signal from the simulator are processed by the radar equipped with a phase corrector circuitry to correct a phase drift problem associated with the use of a small antenna with the simulator.

9 Claims, 5 Drawing Sheets

APPARATUS AND METHODS FOR MOVING TARGET INDICATOR SIMULATION

GOVERNMENT INTEREST

The invention described herein may be manufactured, used, imported and licensed by or for the Government for the United States of America without the payment to me of any royalty thereon.

BACKGROUND OF THE INVENTION

1. Field of the Invention

The present invention relates in general to radar, and in particular to system for simulating a target for pulse Doppler radar that employs Digital Signal Processing.

2. Description of the Prior Art

There are a number of devices for testing and calibrating radars. Such devices are generally known as target simulators. The following references are a sample of teachings related to target simulation.

The patent of Sommers et al., U.S. Pat. No. 3,331,070, discloses a moving target simulator for Moving Target Indicator (MTI) radar. The simulator receives successive pulses from the radar and reflects back the successive pulses while phase-shifting in time each of the reflected successive pulses 180 degrees from the preceding one.

The patent of Eddy, U.S. Pat. No. 4,686,534, discloses a target simulator for a pulse compression radar. The simulator receives a signal from the radar and adds to the signal modulation components which are in both phase or frequency domain and in amplitude domain. The signal is then returned to the radar.

The patent of Warren, U.S. Pat. No. 4,319,247, discloses a target simulator for radar. The simulator samples radar-transmitted pulses and imposes successive delays on the sample. The simulator then retransmits the delayed pulses to the radar. The simulator includes a frequency shifter which simulates Doppler shift. The Warren patent also discloses the returning of the radar-transmitted pulses with pulses that are of successively different amplitude.

The Adams et al., U.S. Pat. No. 3,329,953, discloses a Doppler target simulator which uses a bidirectional phase-shifter controlled by a Doppler signature driver circuit to vary the phase of a returned signal.

These systems do not address the issue of antenna size, the signal-to-noise and the phase-drift problems which are present when a small antenna is used with a simulator. There is a need for a system which does adequately address these problems.

SUMMARY OF THE INVENTION

In view of the above, it is the broad object of the present invention to provide an improved method and apparatus for simulating a moving target for MTI radars that use Digital Signal Processing (DSP), particularly Fast Fourier Transform (FFT) processing.

In one aspect, the present invention relates to a method and system for receiving a signal from an MTI radar, phase-shifting the received signal, and returning the phase-shifted signal to the MTI radar, wherein the method includes detecting a signal from the MTI radar, inputting the detected signal into a processor for processing, outputting the processed signal into a phase shifter, and returning the signal to the MTI radar. The processing includes transforming the detected signal using a series of four cascading Flip Flops connected to a selector.

In a further aspect, the invention relates to simulation of a moving target for MTI radar or a pulse Doppler radar using FFT processing, wherein simulation provides an output of predetermined series of phase-shifted patterned signal such that the FFT processing of the phase-shifted patterned signal by the MTI radar yields spectral lines having infinite isolation.

In a further aspect, the invention relates to a method and system simulating a moving target for MTI radar using FFT processing, wherein the method and system include usage of a reference signal from a preferably passive corner reflector in combination with the simulator's signal to correct the phase shifting that occurs over time, and wherein the simulator is coupled to a small antenna. Other types of reflectors may be used.

In a further aspect, this invention relates to a method for correcting phase-drifting of a signal generated by a Doppler simulator, wherein the method includes the steps of receiving a reference signal vector, the reference signal vector having an in-phase component and a quadrature component; receiving a phase-shifted signal vector from the Doppler simulator, the phase-shifted signal vector having an in-phase component and a quadrature component; computing the difference between said reference signal vector and said phase-shifted signal vector; integrating the difference signal; computing the amplitude of said difference signal, and adding an in-phase component and a quadrature component of said amplitude of said difference signal.

Upon further study of the specification and appended claims, further objects and advantages of this invention will become apparent to those skilled in the art.

BRIEF DESCRIPTION OF THE DRAWINGS

The foregoing and other objects, features, and advantages of the invention will be apparent from the following more particular description of preferred embodiments as illustrated in the accompanying drawings, in which reference character refer to the same parts throughout the various views. The drawing are not necessarily to scale, emphasis instead being placed upon illustrating principles of the invention.

In the accompanying drawings.

DETAILED DESCRIPTION OF THE PREFERRED EMBODIMENTS

For modern pulse radars having Fast-Fourier-Transform (FFT) processing, a simple way of simulating Doppler modulation is by alternatively changing the phase of the reflected pulses by 180 degrees. This results in an apparent single sideband modulation that puts all the energy in one spectral line, with the theoretical infinitive isolation toward the other spectral lines, assuming the absolute radio frequency and roundtrip delay stability. The present moving target simulator (MTS) invention, shown in FIGS. 2A and 2B, provides reflected signals with a phase shift of 180 degrees.

Figure 2A:
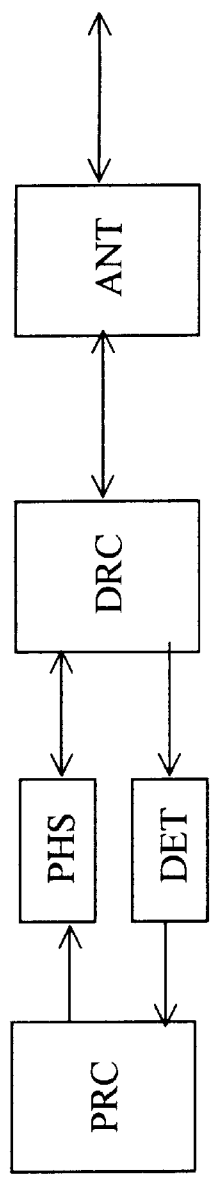
FIG. 2A illustrates a block diagram of the moving target simulator of the present invention.
Figure 2B:
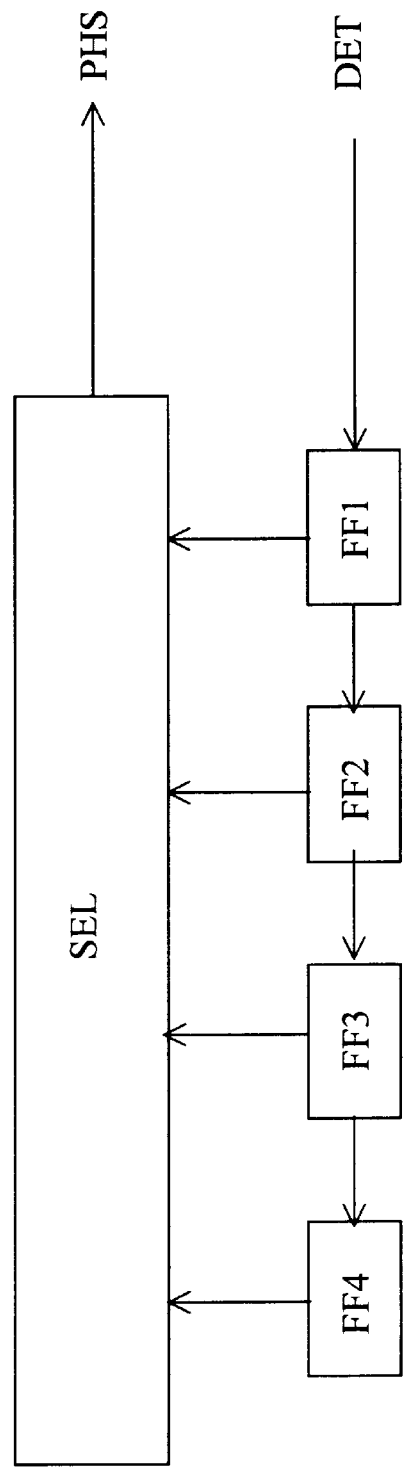
FIG. 2B illustrates the details of the processor of FIG. 2A.

Referring now to FIGS. 2A and 2B, which illustrate a preferred embodiment of the MTS invention, the MTS includes an antenna (ANT) for receiving a signal transmitted from an MTI radar. The received signal is then transmitted to a directional coupler (DRC) and then to a detector (DET) for extracting pulses from the transmitted signal. The extracted pulses are fed into a processor (PRC). If the radar is a 16-channels FFT, the processor module includes at least four cascading Flip-Flop devices designated as FF1, FF2, FF3 and FF4, each of which is connected to a selector, as shown in FIG. 2B. The selector provides output transformed pulses having predetermined pulse patterns which are then fed into a phase-shifter (PHS). During phase-shifting, the transformed pulses are phase-shifted and then propagated back to the MTI radar via the directional coupler and the antenna.

In this preferred embodiment of the present invention, four flip-flops are incorporated into the simulator. However, it will be appreciated by those skilled in the art that the number of flip-flops may be varied in the design of a simulator to accommodate the number of FFT channels of signals of the MTI radar.

It is often undesirable for a radar Doppler simulator to have a large antenna for reasons such as cost, portability, and mobility, etc. A small antenna generally is preferred because for radar testing and calibration purposes a simulator with a small antenna can be transported with ease to any location in the field. Target return is often better approximated or simulated with a small antenna. However, a small antenna collects less energy and reflects weaker signals than a large one. A smaller antenna collects and reflects a signal with minimum signal-to-noise (S/N) ratio. One way to improve this low signal-to-noise ratio is by integrating the received signal over a long period of time. However, a long integration time often results in an intolerable phase drift of the received signal. In order to achieve a desired signal-to-noise ratio, another embodiment of the invention utilizes a large passive corner reflector in the vicinity of the simulator to provide a reference signal.

Figure 1A:
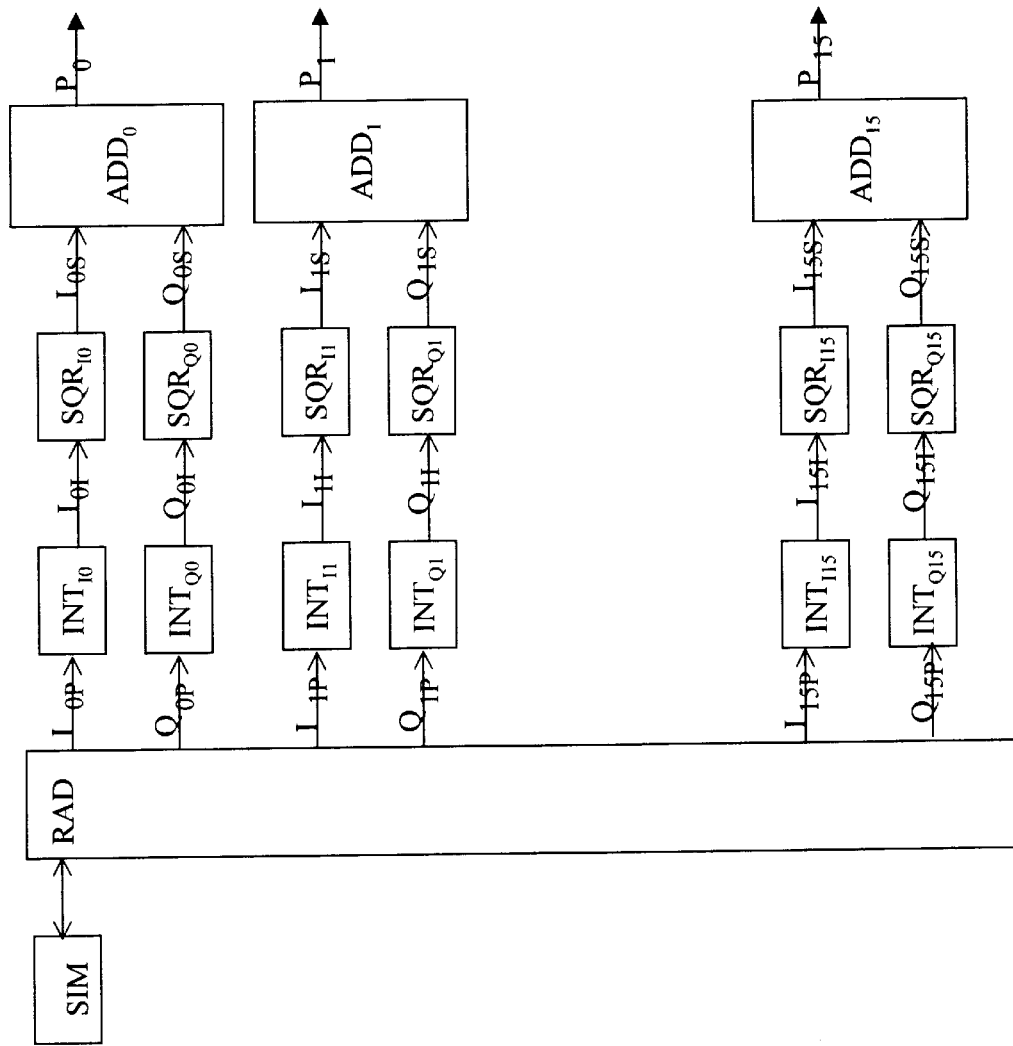
FIG. 1A is a high level diagram illustrating the use of a simulator with an MTI radar system.

Referring now to FIG. 1A, the simulator of the present invention is shown in use with an MTI radar without the use of a reference signal source and the necessary circuitry in the MTI radar system to provide correction to the phase-drift of the signal from the simulator. The antenna (not shown) used with the simulator is of sufficiently large size which provides a signal of an acceptable signal-to-noise ratio.

Figure 1B:
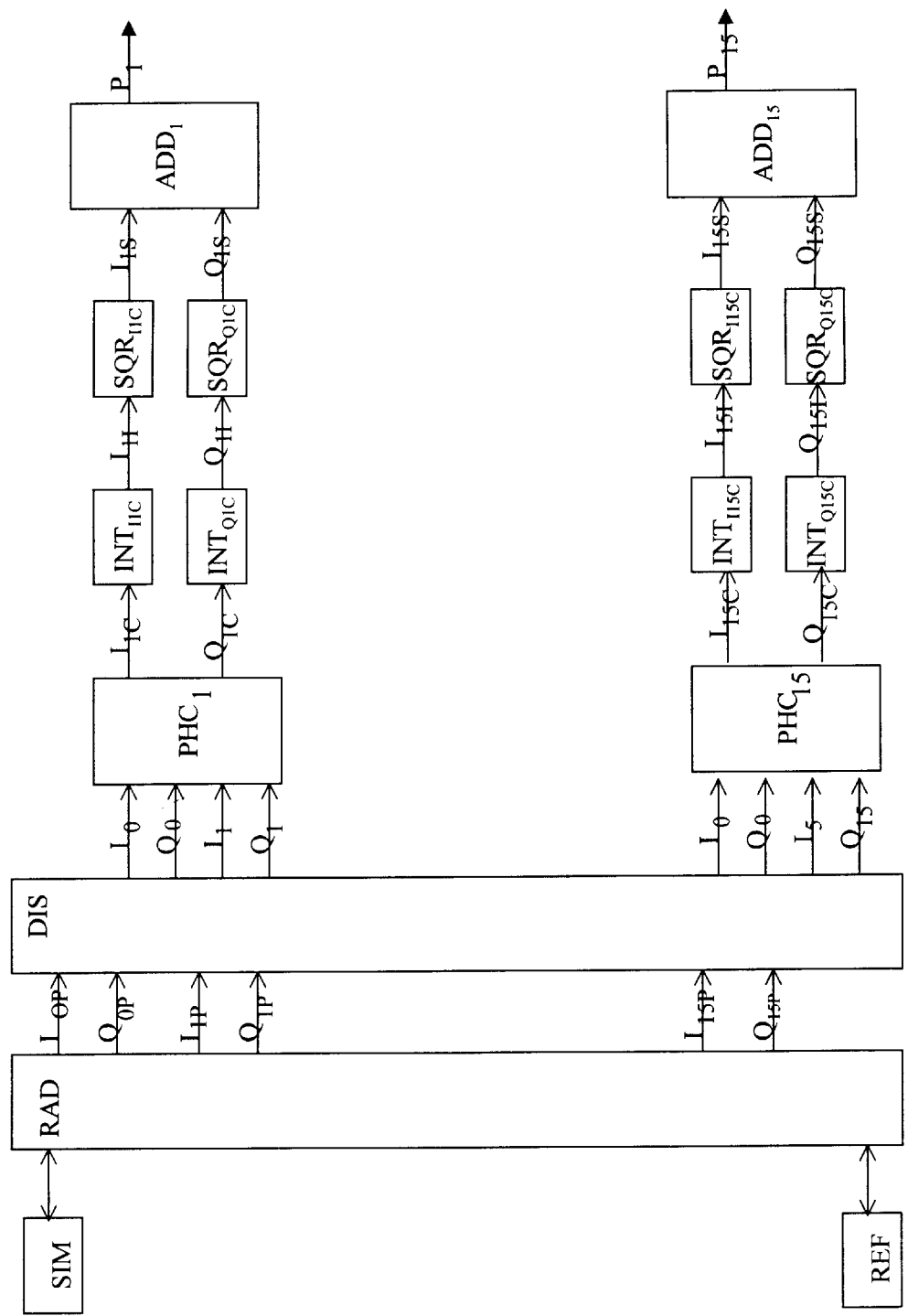
FIG. 1B is a high level diagram illustrating the use of a simulator and a reference signal source with an MTI radar system.

FIG. 1B shows the simulator of the present invention providing a phase-shifted signal in conjunction with a reference signal source to an MTI radar equipped with phase-correcting circuitry of the present invention. Reflected signal from a moving target simulator (SIM) and a reference signal from a corner reflector (REF) are received by an MTI radar (RAD). The MTI radar includes a distributor (DIS) which distributes received signals as fifteen output frequencies into fifteen phase correctors ($PHC_n$, where n={1 ... 15}). The distributor shown may be excluded from this embodiment of the invention by one skilled in the art without adversely effecting the intended function of this invention.

A phase corrector $PHC_1$ functioning as follows will allow all of the PHCs functioning in the same manner as $PHC_1$. The phase corrector $PHC_1$ processes data from two channels of simulator's signal, $Q_{1p}$, for quadrature channel, and $I_{1p}$, for in-phase channel, and from two channels of the reference signal, $Q_{0p}$, and $I_{0p}$. The signals $Q_{0p}$, $I_{0p}$, and $Q_{1p}$, $I_{1p}$ are used in the phase corrector $PHC_1$ to corrects the bothersome phase drift of the simulated Doppler signal from the simulator by providing a phase difference signal from the simulator's signal and the reference signal based on the following equation:

$$V_{1c}=V_{1p}\cdot {}^*V_{0p}=(I_{1p}+j\cdot Q_{1p})(I_{0p}-jQ_{0p}),$$

wherein $V_{1c}$ is a corrected phase vector, $V_{1p}$ is a vector of the simulator signal $I_{1p}$ and $Q_{1p}$, $V_{0p}$ is a phase vector of the reference signals $I_{0p}$, $Q_{0p}$.

The phase-corrected signals $V_{1c}$ from the phase corrector are integrated using integrators (INT), $INT_{I1C}$ and $INT_{Q1C}$. The results of the integration are provided to squarers, $SQR_{I1C}$ and $SQR_{Q1C}$, respectively, to compute the magnitude of the results. The results from the squarers are added together using an adder, $ADD_1$.

Figure 3A:
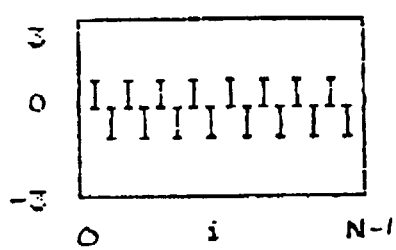
FIGS. 3A–3H show output pulse patterns from the simulator of the present invention.

Referring now to FIGS. 3A–3H, the target simulator is capable of modulating patterns of output pulses as illustrated in FIGS. 3A–3H. The selector SEL of the processor PRC can select signal from any of the four flip-flops. For example, when FF1 is selected, the simulator modulates an output pattern shown in FIG. 3A. FIG. 4A shows a radar spectral display of the FFT-processed output pattern 3A.

Figure 3B:
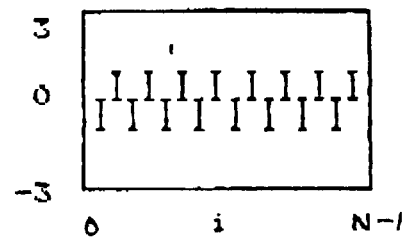
Figure 4A:
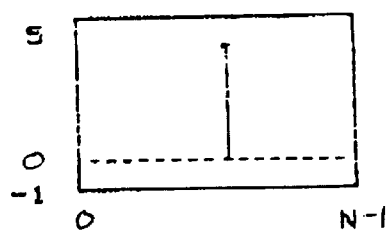
FIGS. 4A–4H show the FFT processed spectral displays of the output pulse patterns 3A–3H by an MTI radar.
Figure 4B:
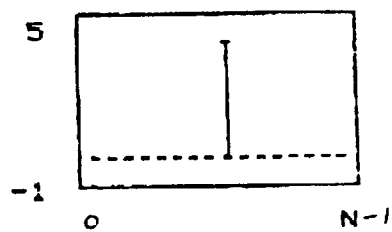

FIG. 3B shows another possible modulated output pattern from the simulator when FF1 is selected. The radar spectral display of this FFT-processed output pattern is shown in FIG. 4B. The output patterns of FIG. 3A and FIG. 3B are relatively phase-shifted. The phase-shift may be caused by different distance between the simulator and the radar or by different starting or turn-on time of the simulator. However, the radar display shows identical output pulses in FIG. 4A and FIG. 4B, wherein the pulses are infinitely isolated with no sidebands.

Figure 3C:
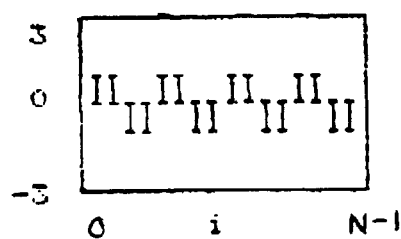
Figure 3D:
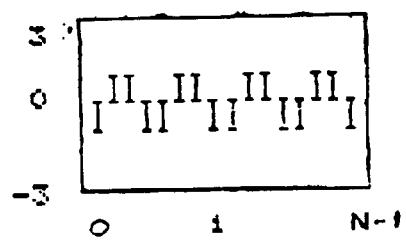
Figure 4C:
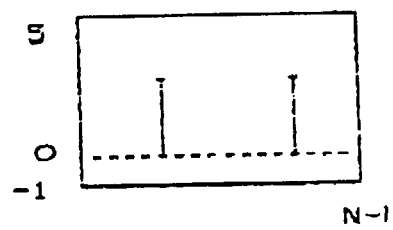
Figure 4D:
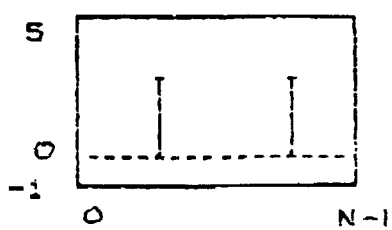

FIGS. 3C and 3D show possible modulated output patterns from the simulator if a signal from FF2 is selected. The resulting FFT-processed radar spectral displays are shown in FIGS. 4C and 4D, corresponding to FIGS. 3C and 3D, respectively. Each of the spectral lines displayed in FIG. 4C and 4D has half of the reflected power from the simulator. The output patterns of FIGS. 3C and 3D are relatively phase-shifted. The phase-shift may be caused by different distance between the simulator and the radar or by different starting or turn-on time of the simulator. However, the radar display shows identical output pulses in FIG. 4C and FIG. 4D, wherein the pulses are infinitely isolated with no sidebands.

Figure 3E:
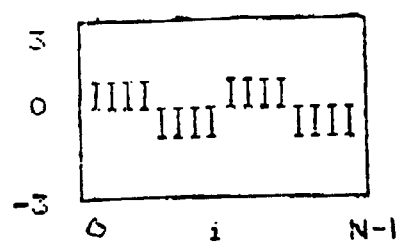
Figure 3F:
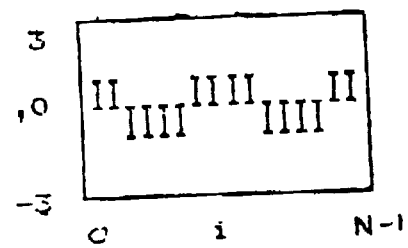
Figure 4E:
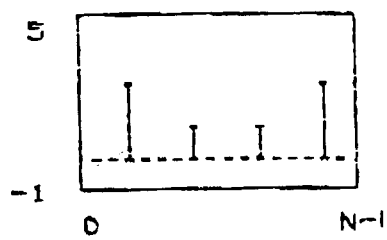
Figure 4F:
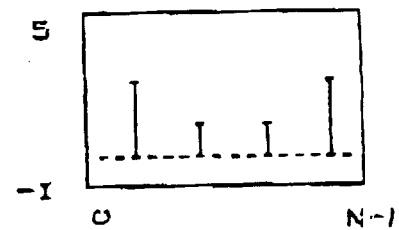

FIGS. 3E and 3F show possible output patterns if signal from FF3 is selected. The resulting FFT-processed radar spectral displays are shown in FIGS. 4E and 4F, corresponding to FIGS. 3E and 3F, respectively, with a certain weighting according to the FFT equations. The output patterns of FIG. 3E and FIG. 3F are relatively phase-shifted. The phase-shift may be caused by different distance between the simulator and the radar or by different starting or turn-on time of the simulator. However, the radar display shows identical output pulses in FIG. 4E and FIG. 4F, wherein the pulses are infinitely isolated with no sidebands.

Figure 3G:
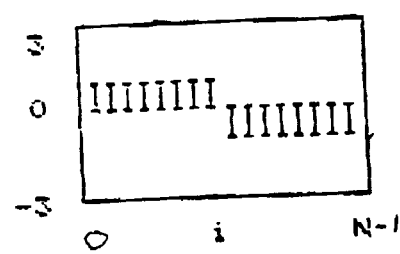
Figure 3H:
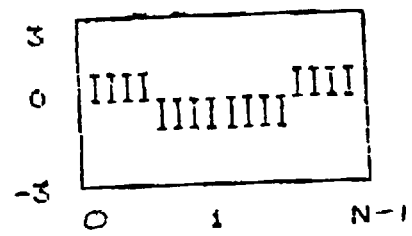
Figure 4G:
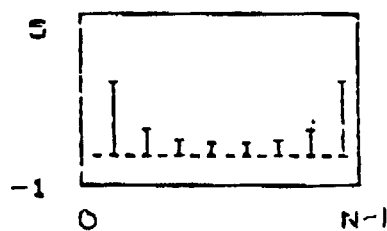
Figure 4H:
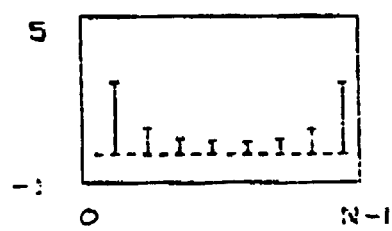

FIGS. 3G and 3H show possible output patterns if a signal from FF4 is selected. The resulting FFT-processed radar spectral displays are shown in FIGS. 4G and 4H, corresponding to FIGS. 3G and 3H, respectively. The modulated signal represented by groups of four pulses (FIGS. 3G and 3H) result in four spectral lines. The signal is displayed by the radar as indicated in FIGS. 4G and 4H. The output patterns of FIG. 3G and FIG. 3H are relatively phase-shifted.

The phase-shift may be caused by different distance between the simulator and the radar or by different starting or turn-on time of the simulator. However, the radar display shows identical output pulses in FIG. 4G and FIG. 4H, wherein the pulses are infinitely isolated with no sidebands.

The output patterns 3A–3H represent a few examples of possible output patterns from the simulator. Variations in output patterns are possible due to different distance between the simulator and the radar or by different starting or turn-on time of the simulator. As illustrated in FIGS. 4A–4H, the simulator can modulate patterns of output signals that, when FFT-processed by the radar, yields a spectral line having infinite isolation and with no sidebands.

More than one MTI simulator can be working in the same range gate and still be separated by infinite isolation.

For high measurement accuracy, it is important to insure synchronization of the MTI modulation with the radar pulse rate. This can be achieved by using a communication link or more easily by using a radar detector including an antenna, crystal detector and a video amplifier. The resulting pulse train is then applied in binary counter fashion to successive flip-flops to provide the changing polarization inputs to a MTI modular. During modulation, the selector provides a signal from a selected flip-flop, clocked by the trailing edge of the pulse train, to the phase-shifter.

The technique discussed can be adapted for a cross-polarization simulator using a square horn as an antenna with both vertical and horizontal polarized outputs and by connecting its cross-polarized ports to the ports of a 180 degree reciprocal phase-shifter.

While the invention has been particularly shown and described with reference to a preferred embodiment thereof, it will be understood by those skilled in the art that various changes in form and details may be made therein without departing from the spirit and scope of the invention.

What I claim is:

1. A system for simulating a moving target for use with a Moving Target Indicator (MTI) radar, wherein said radar transmits a signal to said simulator which modulates a return signal 180° out of phase with the radar-transmitted signal, said simulator comprising:

an antenna for receiving energy from the radar;

a directional coupler connected to said antenna;

a detector connected to said directional coupler for detecting a signal from the energy received;

a processor, wherein said processor further comprises cascading flip-flops, a first of said flip-flops being connected to said detector, and each of said flip-flops being connected to a selector having a selector output; and a phase-shifter connected to said selector output for phase-shifting a signal outputted therefrom, said phase shifter further comprising an output for providing a phase-shifted signal to said directional coupler and said antenna for transmission of the phase-shifted signal.

2. A method for modulating an 180° out-of-phase signal using a Moving Target Indicator (MTI) radar-generated signal, said method comprising the steps of:

receiving the MTI radar-generated signal; transmitting the received signal to a series of flip-flop transformers;

transforming the received signal into predetermined pattern of output pulses using said series of flip-flop transformers, selecting a patterned output signal from one of said flip-flop transformers;

phase-shifting said selected patterned output signal; and transmitting said phase-shifted patterned signal to the MTI radar.

3. The method according to claim 2, further comprising the step of providing a reference signal in combination with said phase-shifted patterned signal to the MTI radar.

4. The method according to claim 3, wherein the step of providing a reference signal further comprises utilizing a corner reflector.

5. The method according to claim 2, further comprising the step of providing a synchronizing signal to said flip-flop transformers.

6. The method according to claim 2, whereby said phase-shifted patterned signal provides spectral line with infinite isolation when processed by FFT-processing by the MTI radar.

7. A system simulating a moving target for MTI radar using FFT processing, said system comprising: using of a reference signal from a corner reflector placed in the vicinity of a simulator in combination with a signal from said simulator to provide a corrected signal to the phase shifting that occurs over time for obtaining a corrected signal.

8. The system according to claim 7, wherein said reference signal is represented by a vector $V_{0p}$, said signal from said simulator is represented by $V_{1p}$, and said corrected signal is represented by $V_{1c}$, which equals $V_{1p} \cdot {}^{*}V_{0p}$.

9. A method for correcting phase-drifting of a signal generated by a Doppler simulator, comprising the steps of:

receiving a reference signal vector, said reference signal vector having an in-phase component and a quadrature component;

receiving a phase-shifted signal vector from the Doppler simulator; said phase-shifted signal vector having an in-phase component and a quadrature component;

computing a corrected signal vector using said reference signal vector and said phaseshifted signal vector components;

said corrected signal has an in-phase component and a quadrature component;

integrating said corrected signal components;

computing the power of said corrected signal components; and adding said in-phase component and said quadrature component of said power of said corrected signal to obtain the integrated power of said corrected signal.

* * * * *